Patented Nov. 14, 1950

2,529,682

UNITED STATES PATENT OFFICE 2,529,682

2,2-BIS(4-METHOXYPHENYL)-1,1,1-TRICHLOROETHANE INSECTICIDAL DUST AND PROCESS FOR MAKING SAME

Albert L. Flenner, Wilmington, Del., assignor to E. I. du Pont de Nemours & Company, Wilmington, Del., a corporation of Delaware No Drawing. Application July 16, 1946, Serial No. 683,988

5 Claims. (Cl. 167—42)

This invention relates to insecticides. It is more particularly directed to methods for the preparation of powdered insecticidal compositions containing 2,2-bis-(4-methoxyphenyl)-1,1,1-trichloroethane which comprise fusing the 2,2-bis-(4-methoxyphenyl)-1,1,1-trichloroethane and mixing it with a finely divided adsorbent powder in proportions to give a dry product, and to the compositions so prepared.

It has recently been discovered that 2,2-bis-(4-methoxyphenyl)-1,1,1-trichloroethane, which will be referred to dereinafter as di(methoxyphenyl)trichloroethane, is an effective insecticidal agent for the control of a variety of insect pests. The compound is a solid melting at 89–89.5° C. after recrystallization, but before purification it normally has a melting point range of from about 78 to about 85° C. when prepared by the condensation of anisole and chloral. The product has a waxlike, adhesive property which in combination with its relatively low melting point has caused difficulties in the preparation of finely divided insecticidal dusts particularly in the preparation of compositions containing a high proportion of di(methoxyphenyl)trichloroethane.

It is an object of the invention to provide practical and efficient methods for preparing finely divided compositions containing di(methoxyphenyl)trichloroethane. It is an object to provide methods readily adapted to preparing finely divided compositions containing di(methoxyphenyl)trichloroethane in high concentrations. Still further objects will become apparent hereinafter.

The foregoing and other objects of the invention are attained by admixing fused di(methoxyphenyl)trichloroethane with a finely divided adsorbent solid in proportions to give a dry product.

The di(methoxyphenyl)trichloroethane suitable for use in the processes of the invention may be the highly refined pure product or the crude product normally having a melting point between 78 and 85° C. which may be obtained by the condensation of two moles of anisole with one mole of chloral. Processes for the manufacture of this product are fully disclosed in copending applications Serial Nos. 687,610 and 699,595, filed August 1, 1946, and September 26, 1946, now Patent Numbers 2,477,665 and 2,484,056, respectively.

The finely divided adsorbent solids which may be admixed with the fused di(methoxyphenyl)trichloroethane in carrying out the processes of the invention are those porous materials such as fuller's earth, tricalcium phosphate, magnesium carbonate, dicalcium phosphate, diatomaceous earths such as celite or Dicalite, kieselguhr, chalk, charcoal, walnut shell flour, other nut shell flours, and wood flour. It is preferable that these adsorbent powders have an average particle size less than about 50 microns for use in the processes of the invention.

The foregoing adsorbent powders are useful in the preparation of compositions containing di(methoxyphenyl)trichloroethane in concentration as high as about 60 per cent. In order, however, to prepare dust or water-dispersible powders containing amounts of di(methoxyphenyl)trichloroethane in excess of 60 per cent, it is generally necessary to employ as an adsorbent powder an inorganic siliceous material having a low bulk density. The adsorbent materials preferred for this use are those having a bulk density less than 0.15 grams per cc. In using these low bulk density adsorbent powders, compositions may be obtained according to the processes of this invention containing di(methoxyphenyl)trichloroethane in amounts as large as 80 per cent by weight. One may, of course, use mixtures of the low bulk density adsorbent materials and the above-mentioned higher bulk density adsorbent powders to obtain compositions having a di(methoxyphenyl)trichloroethane content varying between 60 per cent and 80 per cent.

Typical of the inorganic siliceous materials having a bulk density less than 0.15 gram per cc. are Santocel 45 and Santocel 58, silica aerogels sold by the Monsanto Chemical Company; "Super-Absorbit," an expanded vermiculite; silicic acid of the special bulky grade supplied by the Mallinckrodt Company; hammer-milled finely pulverized asbestos; Celite 209, a diatomaceous earth sold by the Johns-Manville Company; and the calcium silicates sold under the name of "Silene."

The term "bulk density" as used in connection with the aforementioned inorganic siliceous adsorbent materials is the weight in grams of one cubic centimeter of loose, dry material measured without packing. This physical characteristic of fine powders is also referred to in the literature as "apparent density." The technique of making bulk density or apparent density determinations is set out, for example, in Gardner "Physical and Chemical Examinations of Paints, Varnishes, Lacquers, and Colors," 9th edition, 1939, page 279.

One skilled in the art will with the provision of the above list of adsorbent materials and with an understanding of the described requirements and functions of the powders employed in preparing the compositions of this invention readily know the types of materials which will serve as adsorbent powders. If there is a question as to the suitability of a selected powder to function as an adsorbent, such suitability may be readily determined by the following simple test to which all the above-mentioned adsorbent powders respond:

Take 100 grams of the powdered material to be evaluated. This material should have an average particle size of not more than about 50 microns. While agitating the powder vigorously, add to it 100 grams of molten di(methoxyphenyl)-trichloroethane maintained at a temperature above 90 but below 115° C. to obtain a homogeneous dispersion of the molten material in the powder. In other words, the rate of addition of the molten di(methoxyphenyl)trichloroethane and the agitation should be coordinated and the agitation continued until the molten di(methoxyphenyl)trichloroethane is uniformly dispersed thruout the powder. The agitation is then stopped and the mix is allowed to cool so that the molten di(methoxyphenyl)trichloroethane solidifies. If the mix after cooling to about room temperature can be readily poured from the container as a free-flowing dust having finely divided discrete particles, then the diluent under evaluation is said to be an adsorbent powder according to the usage employed herein. If, on the other hand, the cooled mix is not free flowing, contains gummy agglomerates, or is a non-pulverulent solid mass, then the diluent is said to be non-adsorbent.

Powders which are of the non-adsorbent type and which are therefore not suitable in preparing the compositions of the invention are of the class illustrated by the following typical examples: talc, pyrophyllite, bentonite, kaolin, gypsum, pumice stone, and mica.

In carrying out the processes of the invention, it is preferred to introduce fused di(methoxyphenyl)trichloroethane at a temperature between 90 and 115° C. into a mass of the adsorbent powder which is being agitated in a suitable mixing apparatus. The minimum temperature to which the di(methoxyphenyl)trichloroethane should be heated in carrying out the process may, of course, be lowered and approach more closely the melting point of the compound by maintaining the adsorbent powder at an elevated temperature during the addition of the fused product. The usual ribbon blenders, dough mixers, or sigma arm mixers are well suited for mixing the molten di(methoxyphenyl)trichloroethane with the adsorbent powder.

The mixing apparatus is charged with the finely divided adsorbent powder and the fused di(methoxyphenyl)trichloroethane is fed in slowly so that the mix remains apparently dry thruout the mixing operation; that is, so that the mass remains as a free-flowing, pulverulent solid thruout the mixing operation. The mixture is more uniform and less agglomeration occurs as the rate of addition of fused di(methoxyphenyl)trichloroethane is decreased or the distribution of the fused material thruout the mass is improved.

The processes of the invention are well suited for the preparation of dusts containing di-(methoxyphenyl)trichloroethane in concentration as high as 80 per cent. Dusts containing up to 60 per cent di(methoxyphenyl)trichloroethane are readily prepared as has been set out above by the use of any of the various finely divided adsorbent powders and when more concentrated compositions are desired, then it is preferred to employ in total or at least in part one or more of the inorganic siliceous adsorbent materials having a bulk density less than 0.15 gram per cc.

By the use of suitably pulverized adsorbent powder and properly controlled rate of addition of fused di(methoxyphenyl)trichloroethane and mixing, there may be obtained directly from the mixer a dust suitable for use without further processing. The dust may, of course, if desired, be pulverized to reduce the particle size still further. The dust obtained from the mixer may also be admixed with an additional amount of a finely divided powder to yield less concentrated insecticidal compositions. Powders suitable as diluents may be either of the adsorbent or the non-adsorbent type such as those which have been described above. Additionally, the dusts from the mixer either with or without further grinding or with or without dilution with a dust may be admixed with a wetting, dispersing, or similar conditioning agent to provide powdered compositions which are readily dispersible in water. Alternatively, the wetting or dispersing agent may be added at the time of the initial mixing operation.

The invention may be more fully understood by reference to the following examples:

*Example 1*

One hundred (100) parts by weight of di(methoxyphenyl)trichloroethane having a melting point of 81° C. is melted and heated to 100° C. and then poured in a fine stream into 100 parts by weight of diatomaceous earth having an average particle size of about 20 microns. While the fused di(methoxyphenyl)trichloroethane is being added, the diatomaceous earth is stirred constantly. The stirring is continued after completing the addition of the fused di(methoxyphenyl)trichloroethane until the temperature of the mixture drops to about 50° C. There is thus obtained a free-flowing powder which can be used as an insecticidal dust as is or can be ground to obtain a product having a smaller particle size, if so desired.

The dust composition of this example may be mixed with wetting and dispersing agents to provide water-dispersible powders and it may be mixed with inert powdered diluents or other insecticidal adjuvants, insecticides, fungicides, and bactericides.

*Example 2*

One hundred (100) parts by weight of di-(methoxyphenyl)trichloroethane having a melting point at about 83° C. is melted and heated to about 95° C. and then poured in a fine stream into a mixture consisting of 91 parts by weight of fuller's earth having an average particle size of about 20 microns, 8 parts by weight of goulac, and 1 part by weight of Alkanol B, a sodium alkylnaphthalene sulfonate. By mixing the composition thoroly while cooling to about 50° C., after completion of the di(methoxyphenyl)trichloroethane addition there is obtained a free-flowing powder.

The powdered composition of this example can be used either with or without further grinding as a water-dispersible powder for the control of insects.

*Example 3*

To a mixture of 10 parts by weight of Santocel 58, a silica aerogel having an average particle size of 0.12 grams per cc., and 15 parts by weight of 20-micron size fuller's earth being agitated in a ribbon mixer, there is added slowly 100 parts by weight of fused di(methoxyphenyl)-trichloroethane heated to a temperature of about 90° C. After completing the di(methoxyphenyl) trichloroethane addition, the mixture is stirred constantly until the temperature drops to 50° C. There is thus obtained a composition containing 80 per cent di(methoxyphenyl) trichloroethane. This dust composition may be used as is or it may be admixed with wetting and dispersing agents to provide water-dispersible powders or diluted with inert powders to give dusts containing smaller amounts of the toxicant for application in insect control.

I claim:

1. The method for preparing an insecticidal dust composition containing 2,2-bis(4-methoxyphenyl)-1,1,1-trichloroethane as an essential active ingredient which comprises gradually introducing the 2,2-bis(4-methoxyphenyl)-1,1,1-trichloroethane in a fused state at a temperature above 90° C. but below about 115° C. into a mass of adsorbent powder while agitating the powder to effect a mixture of the fused material and the adsorbent powder, the rate of addition of the fused 2,2-bis(4-methoxyphenyl)-1,1,1-trichloroethane into the adsorbent powder being controlled so that the mixture remains as an apparently dry pulverulent solid thruot the addition and mixing operation, and continuing the agitation following completion of the addition of the fused 2,2-bis(4-methoxyphenyl)-1,1,1-trichloroethane while cooling the mixture to a temperature not in excess of about 50° C., whereby there is obtained a free-flowing dust product characterized by having the 2,2-bis-(4-methoxyphenyl)-1,1,1-trichloroethane adsorbed in the pores and on the surfaces of the adsorbent powder.

2. The method for preparing an insecticidal dust composition containing about 60 to 80% by weight 2,2-bis(4-methoxyphenyl)-1,1,1-trichloroethane and the remainder essentially an adsorbent powder which comprises gradually introducing the 2,2-bis(4-methoxyphenyl)-1,1,1-trichloroethane in a fused state into the adsorbent powder which consists, at least in part, of an inorganic siliceous material having a bulk density less than 0.15 grams per cc. while agitating the powder to effect a mixture of the fused material and the adsorbent powder, the rate of addition of the fused 2,2-bis(4-methoxyphenyl)-1,1,1-trichloroethane into the adsorbent powder being controlled so that the mixture remains as an apparently dry pulverulent solid thruout the addition and mixing operation, and continuing the agitation following completion of the addition of the fused 2,2-bis(4-methoxyphenyl)-1,1,1-trichloroethane while cooling the mixture to a temperature not in excess of about 50° C., whereby there is obtained a free-flowing dust product characterized by having the 2,2-bis(4-methoxyphenyl)-1,1,1-trichloroethane adsorbed in the pores and on the surfaces of the adsorbent powder.

3. The method of claim 1 in which the adsorbent powder is a diatomaceous earth.

4. The method of claim 1 in which the adsorbent powder is fuller's earth.

5. The method of claim 1 in which the adsorbent powder comprises an inorganic siliceous material having a bulk density less than 0.15 grams per cc.

ALBERT L. FLENNER.

REFERENCES CITED

The following references are of record in the file of this patent:

UNITED STATES PATENTS

| Number | Name | Date |
|---|---|---|
| 2,146,739 | Heath | Feb. 14, 1939 |
| 2,191,421 | Boyce | Feb. 20, 1940 |
| 2,257,545 | Curtis | Sept. 30, 1941 |
| 2,349,814 | Deonier et al. | May 30, 1944 |
| 2,420,928 | Bousquet et al. | May 20, 1947 |
| 2,444,752 | Siegler | July 6, 1948 |

FOREIGN PATENTS

| Number | Country | Date |
|---|---|---|
| 446,935 | Belgium | Sept. 30, 1942 |

OTHER REFERENCES

Science, May 4, 1945, pages 464 and 465 by Prill et al. (Copy in Patent Office Library.)